(12) United States Patent
Wu et al.

(10) Patent No.: US 7,679,927 B2
(45) Date of Patent: Mar. 16, 2010

(54) ELECTRONIC DEVICE ASSEMBLY WITH TRANSFER CARD

(75) Inventors: Chia-Kang Wu, Taipei Hsien (TW);
Chieh Yang, Taipei Hsien (TW);
Yi-Lung Chou, Taipei Hsien (TW);
Li-Ping Chen, Tapiei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 286 days.

(21) Appl. No.: 11/833,243

(22) Filed: Aug. 3, 2007

(65) Prior Publication Data
US 2008/0298032 A1 Dec. 4, 2008

(30) Foreign Application Priority Data
Jun. 4, 2007 (CN) .................... 2007 2 0200443 U

(51) Int. Cl.
*H05K 1/18* (2006.01)
(52) U.S. Cl. ................... 361/767; 361/724; 439/638
(58) Field of Classification Search ........... 361/767, 361/725, 768, 679.33, 679.34, 679.32, 679.41, 361/679.43, 724; 439/76.1, 638
See application file for complete search history.

(56) References Cited

U.S. PATENT DOCUMENTS

| | | | | |
|---|---|---|---|---|
| 5,035,627 A | * | 7/1991 | Burnett et al. | 439/64 |
| 6,781,391 B2 | * | 8/2004 | Reed et al. | 324/754 |
| 6,991,494 B1 | * | 1/2006 | Spink, Jr. | 439/607.27 |
| 7,057,903 B2 | | 6/2006 | Kuo | |
| 7,120,032 B2 | | 10/2006 | Lin et al. | |
| 7,175,444 B2 | * | 2/2007 | Lang et al. | 439/76.1 |
| 7,248,468 B1 | * | 7/2007 | Hsu | 361/679.33 |

* cited by examiner

*Primary Examiner*—Michael C Zarroli
(74) *Attorney, Agent, or Firm*—Frank R. Niranjan

(57) ABSTRACT

An electronic device assembly includes an electronic device, a transfer card configured for connecting the electronic device to another electronic device, and a fixing board for mounting the transfer card to the electronic device. The electronic device includes a front wall defining a port. The transfer card is coupled to the electronic device. The transfer card comprises a printed circuit board perpendicular to the front wall, a first connector arranged on the elongated printed circuit board and protruding beyond a first longitudinal edge of the printed circuit board for engagement in the port in the front wall of the electronic device, and a second connector arranged on the printed circuit board and protruding beyond an opposite second longitudinal edge of the printed circuit board.

15 Claims, 3 Drawing Sheets

ELECTRONIC DEVICE ASSEMBLY WITH TRANSFER CARD

BACKGROUND OF THE INVENTION

1. Field of the Invention

The present invention relates to electronic device assemblies, particularly to an electronic device assembly with transfer card for coupling an electronic device to another electronic device.

2. Description of Related Art

With the development of the information industry, various kinds of electronic devices are often connected together to perform data exchange. However, different kinds of electronic devices usually adopt different transfer interfaces. The electronic devices cannot be connected together directly via the transfer interfaces. At this time, a transfer card is generally used for connecting the electronic devices together. Conventionally, the transfer card includes two connectors respectively mounted on a top surface and a bottom surface thereof, for respectively connecting to the electronic devices. When the transfer card is connected to the electronic devices, the height of the transfer card is generally greater than the electronic devices. When the electronic devices are disposed in an enclosure, the transfer card will occupy a lot of vertical space.

What is needed, therefore, is an electronic device assembly with transfer card which saves space in an electronic device enclosure.

SUMMARY

An electronic device assembly includes an electronic device, a transfer card configured for connecting the electronic device to another electronic device, and a fixing board for mounting the transfer card to the electronic device. The electronic device includes a front wall defining a port. The transfer card is coupled to the electronic device. The transfer card comprises a printed circuit board perpendicular to the front wall, a first connector arranged on the elongated printed circuit board and protruding beyond a first longitudinal edge thereof for engagement in the port in the front wall of the electronic device, and a second connector arranged on the printed circuit board and protruding beyond an opposite second longitudinal edge thereof.

Other advantages and novel features of the present invention will become more apparent from the following detailed description of a preferred embodiment when taken in conjunction with the accompanying drawings, in which:

DETAILED DESCRIPTION OF THE EMBODIMENT

Figure 1:
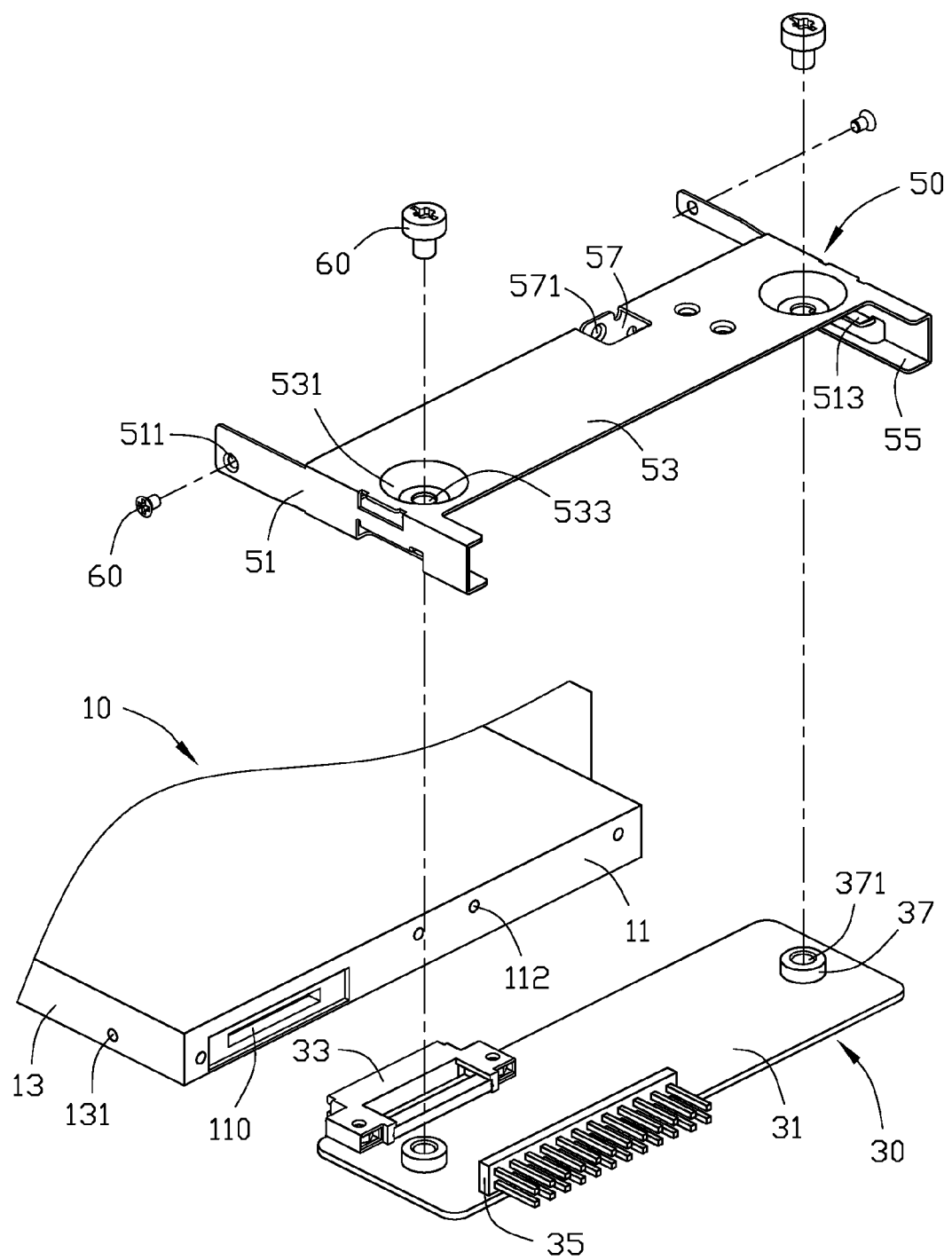
FIG. 1 is an exploded, isometric view of an electronic device assembly with a transfer card in accordance with a preferred embodiment, including an electronic device, a transfer card, and a fixing bracket.

Referring to FIG. 1, an electronic device assembly, includes an electronic device 10, a transfer card 30, and a fixing bracket 50 for mounting the transfer card to the electronic device 10.

The electronic device 10 includes a front wall 11 and a pair of opposite sidewalls 13 perpendicular to the front wall 11. A port 110 is defined in the front wall 11. A securing hole 112 is defined in a middle portion of the front wall 11. Each sidewall 13 defines a securing hole 131.

The transfer card 30 is mounted to the electronic device 10 for connecting the electronic device 10 to another electronic device. The transfer card 30 includes a printed circuit board 31 perpendicular to the front wall 11 of the electronic device 10. The printed circuit board 31 includes two opposite long edges and two opposite short edges. A first connector 33 protrudes from one of the long edges of the printed circuit board 31 toward the front wall 11, for coupling to the port 110 of the electronic device 10. A second connector 35 different from the first connector 33 protrudes from the opposite long side edge of the printed circuit board 31 away from the front wall 11 of the electronic device 10, for coupling to another electronic device. A pair of supporting posts 37 aligned in a lengthways direction of the printed circuit board 31 protrudes perpendicularly from the printed circuit board 31 between the first connector 33 and the second connector 35. A mounting hole 371 is defined in a center of each supporting post 37.

The fixing bracket 50 is substantially H-shaped, which includes a pair of parallel arms 51. Each arm 51 has a connecting portion and an extending portion. A top wall 53 perpendicular to the pair of arms 51 is connected therebetween at upper edges of the connecting portions. A supporting flange 55 is bent in from a lower edge of the connecting portion of each arm 51. A securing hole 511 is defined in the extending portion of each arm 51 corresponding to the securing hole 131 in the electronic device 10. A tab 513 parallel to the supporting flange 55 is bent in from the each arm 51 over the supporting flange 55. A pair of guiding rails is defined between the tabs 513 and the supporting flanges 55, for receiving the short edges of the transfer card 30 therein. A pair of recesses 531 is spacedly defined in the top wall 53. A securing hole 533 is defined in a center of each recess 531 corresponding to the mounting hole 371 in each supporting post 37. A flange 57 extends down from an edge of the top wall 53 adjacent to the extending portion of the arms 51. A fixing hole 571 is defined in the flange 57 corresponding to the securing hole 112 in the front wall 11 of the electronic device 10.

Figure 2:
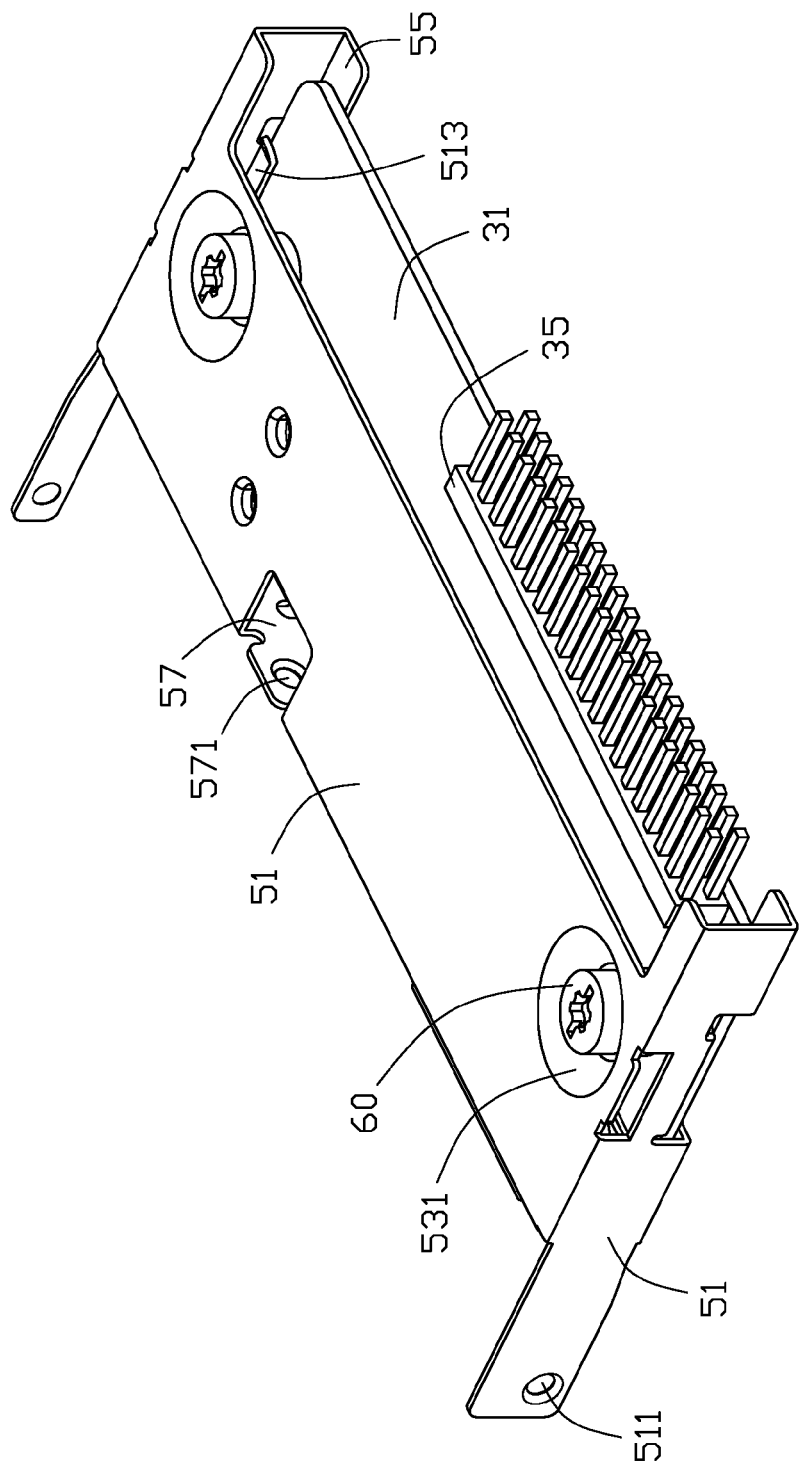
FIG. 2 is an assembled, isometric view of the transfer card and the fixing bracket in accordance with the preferred embodiment.
Figure 3:
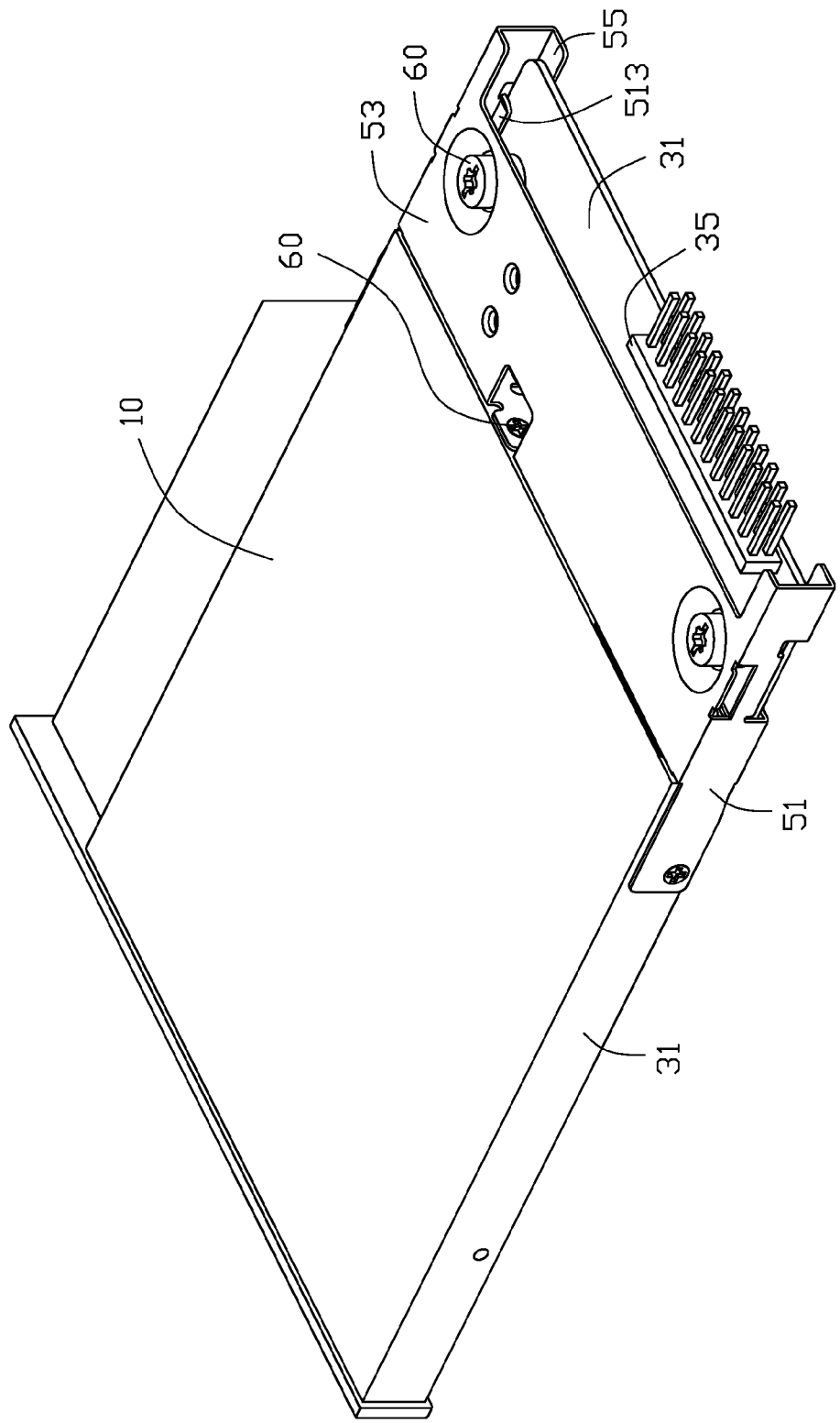
FIG. 3 is an assembled, isometric view of the electronic device in FIG. 1.

Referring to FIGS. 2 and 3, in assembly, the transfer card 30 is slid into the fixing bracket 50 along the supporting flange 55 thereof, until the bottom surfaces of the recesses 531 abut on the supporting posts 37 and the mounting holes 371 of the supporting posts 37 are aligned with the securing holes 533 in the recesses 531. The short edges of the transfer card 30 are sandwiched between the tabs 513 and the supporting flange 55. A pair of fasteners 60 is received in the corresponding securing holes 533 and the mounting holes 371 to secure the transfer card 30 to the fixing bracket 50. Then, the transfer card 30 is attached to the electronic device 10 with the first connector 33 being coupled to the port 110 of the electronic device 10. The extending portions of the arms 51 of the fixing bracket abut against the sidewalls 13 of the electronic device 10, with the securing holes 511 in the arms 51 being aligned with the securing holes 131 in the sidewalls 13. The flange 57 of the fixing bracket 50 abuts against the front wall 11 of the electronic device 10, with the fixing hole 571 in the flange 57 being aligned with the securing holes 112 in the front wall 11. A pair of fasteners 60 is respectively received in the corresponding securing holes 511 and 131, and another fastener 60 is received in the fixing hole 571 and the securing hole 112, to securely mount the transfer card 30 to the electronic device 10, thereby the transfer card 30 and the electronic device 10 are aligned in a horizontal direction, thus saving space in an enclosure receiving the electronic device 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device assembly, comprising:
   an electronic device having a front wall, a pair of sidewalls perpendicular to the front wall, and a port defined in the front wall;
   a transfer card coupled to the electronic device, the transfer card comprising a printed circuit board perpendicular to the front wall, a first connector arranged on the elongated printed circuit board and protruding beyond a first longitudinal edge thereof for engagement in the port in the front wall of the electronic device, and a second connector arranged on the printed circuit board and protruding beyond an opposite second longitudinal edge thereof; and
   a fixing bracket secured to the transfer card, the fixing bracket having a pair of arms abutting against and secured to the sidewalls of the electronic device and connects the transfer card to the electronic device.

2. The electronic device assembly as described in claim 1, wherein the fixing bracket comprises a top wall located between and connected to the pair of arms; the printed circuit board of the transfer card is parallel to and secured to the fixing bracket top wall.

3. The electronic device assembly as described in claim 2, wherein a pair of supporting flanges parallel to the top wall are bent in from lower edges of the pair of arms, for supporting the transfer card thereon.

4. The electronic device assembly as described in claim 3, wherein two tabs are bent in from the arms over the supporting flange, and the other short edges of the transfer card are sandwiched between the supporting flanges and the tabs.

5. The electronic device assembly as described in claim 2, wherein a pair of supporting posts each defining a mounting hole protrudes from the transfer card, a pair of securing holes corresponding to the mounting holes is defined in the top wall of the fixing bracket, a pair of fasteners are received in the corresponding mounting holes and securing holes to secure the transfer card to the fixing bracket.

6. The electronic device assembly as described in claim 2, wherein each sidewall of the electronic device defines a securing hole, each arm of the fixing bracket defines a securing hole corresponding to the securing hole in the sidewall, a fastener is received in each sidewall through the securing holes to secure the fixing bracket to the electronic device.

7. An electronic device assembly, comprising:
   an electronic device having a front wall, a pair of sidewalls perpendicular to the front wall, and a port defined in the front wall;
   a transfer card comprising a printed circuit board and a first connector coupled to the port configured for establishing communication between the transfer card and the electronic device, a longitudinal edge of the printed circuit board being disposed adjacent to and facing toward the front wall of the electronic device; and
   a fixing bracket attached to the transfer card and the electronic device, the fixing bracket having a pair of arms abutting against and secured to the sidewalls of the electronic device so as to connect the transfer card to the electronic device.

8. The electronic device assembly as described in claim 7, wherein the printed circuit board is perpendicular to the front wall, the first connector attached on the printed circuit board and protruding beyond a first long edge thereof the top face for engagement in the port in the front wall of the electronic device.

9. The electronic device assembly as described in claim 8, wherein a second connector is arranged on the printed circuit board and protrudes beyond an opposite second long edge of the printed circuit board facing away from the front wall, configured for connecting to another electronic device.

10. The electronic device assembly as described in claim 7, wherein the fixing bracket comprises a top wall located between the two arms; the printed circuit board of the transfer card is parallel to and secured to the top wall.

11. The electronic device assembly as described in claim 10, wherein a pair of supporting flanges parallel to the top wall are bent inward from lower edges of the pair of arms, for supporting the transfer card thereon.

12. The electronic device assembly as described in claim 11, wherein a pair of tabs are bent in from the arms over the supporting flange, short edges of the transfer card are sandwiched between the supporting flanges and the tabs.

13. The electronic device assembly as described in claim 10, wherein a pair of supporting posts each defining a mounting hole protrudes from the transfer card, a pair of securing holes corresponding to the mounting holes is defined in the top wall of the fixing bracket, a pair of fasteners is respectively received in the corresponding mounting holes and securing holes to secure the transfer card to the fixing bracket.

14. The electronic device assembly as described in claim 10, wherein each sidewall of the electronic device defines a securing hole, each arm of the fixing bracket defines a securing hole corresponding to the securing hole in the sidewall, each sidewall receives a fastener through the securing holes to secure the fixing bracket to the electronic device.

15. An electronic device assembly comprising:
   an electronic device having a front wall and a port arranged in the sidewall;
   a transfer card comprising a printed circuit board having a flat edge disposed adjacent to the front wall, a first connector arranged on the printed circuit board at the flat edge thereof engaging in the port, and a second connector arranged on the printed circuit board, the flat edge having a length substantially equal to a length of the front wall of the electronic device; and
   a fixing frame comprising a base plate and two brackets arranged at opposite ends of the base plate, the brackets each having a first end secured to the electronic device and an opposite second end having a receiving slot for retainably receiving therein opposite edges of printed circuit board which are distinct from the flat edge thereof.

* * * * *